(12) United States Patent
Clemen, Jr. et al.

(10) Patent No.: US 9,820,367 B2
(45) Date of Patent: *Nov. 14, 2017

(54) APPARATUSES, METHODS AND SYSTEMS FOR PASSIVE COUNTER-DIRECTED ENERGY PLATFORM PROTECTION

(71) Applicant: The Boeing Company, Seal Beach, CA (US)

(72) Inventors: Mark J. Clemen, Jr., Bremerton, WA (US); Alan F. Stewart, Seattle, WA (US); John R. Hull, Sammamish, WA (US); Keith J. Davis, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 1171 days.

This patent is subject to a terminal disclaimer.

(21) Appl. No.: 13/932,803

(22) Filed: Jul. 1, 2013

(65) Prior Publication Data
US 2016/0165707 A1 Jun. 9, 2016

(51) Int. Cl.
| | |
|---|---|
| *H05F 3/00* | (2006.01) |
| *H05F 7/00* | (2006.01) |
| *B64D 45/02* | (2006.01) |
| *B60R 13/08* | (2006.01) |

(52) U.S. Cl.
CPC ............ *H05F 7/00* (2013.01); *B60R 13/08* (2013.01); *B64D 45/02* (2013.01)

(58) Field of Classification Search
CPC ............ B60R 13/08; B64D 45/02; H05F 7/00
USPC .................................. 361/212, 218
See application file for complete search history.

(56) References Cited

U.S. PATENT DOCUMENTS

| | | | |
|---|---|---|---|
| 4,824,713 A * | 4/1989 | Brick ............. | B64D 45/02 174/2 |
| 6,177,189 B1 | 1/2001 | Rawlings et al. | |
| 7,869,181 B2 | 1/2011 | Le | |
| 2003/0152766 A1* | 8/2003 | Vargo ............. | B32B 7/12 428/343 |
| 2006/0051592 A1* | 3/2006 | Rawlings ......... | B32B 15/08 428/423.1 |
| 2008/0142238 A1* | 6/2008 | Rawlings ......... | B64D 45/02 174/2 |
| 2010/0134945 A1 | 6/2010 | Rawlings et al. | |

* cited by examiner

*Primary Examiner* — Thienvu Tran
*Assistant Examiner* — Lucy Thomas
(74) *Attorney, Agent, or Firm* — Coats & Bennett, PLLC (57) ABSTRACT

The present disclosure relates to the passive initiation and release of incident energy-dissipating material from locations on an incident energy target surface as a counter measure response for the protection of a platform. The response is activated over a predetermined area or areas on an incident energy target surface in response to an incident directed energy sensed on a target surface.

20 Claims, 8 Drawing Sheets

APPARATUSES, METHODS AND SYSTEMS FOR PASSIVE COUNTER-DIRECTED ENERGY PLATFORM PROTECTION

TECHNOLOGICAL FIELD

The present disclosure relates generally to the field of reactive layers applied to a material surface including materials designed to be released from such layers. More specifically, the present disclosure relates to apparatuses, methods and systems for passively sensing incident directed energy and substantially simultaneously selectively activating counter-directed energy protection of a substrate surface.

BACKGROUND

The use of ablative layers on surfaces is known for the purpose of dissipating electrical lightning strikes and for heat dissipation. In spacecraft design, ablation is used to both cool and protect mechanical parts that would otherwise be damaged by extremely high temperatures. For example, ablative layers on structures such as, for example, heat shields and rocket engine nozzles are designed to detach from a surface for the purpose of directing heat away from a surface exposed to heat stress. In such uses, the ablative surface is exposed to significant heat. When a critical temperature is reached, the reactive ablative material reaches its sublimation temperature and "explodes" away from the surface. In essence, ablative material is therefore designed to slowly burn away in a controlled manner, so that heat can be carried away from the spacecraft by the gases generated by the ablative process, while the remaining solid material insulates the craft from superheated gases.

Material ablation at high power densities is a complex combination of processes. To protect the underlying structure, ablative materials have been selected to be thermal insulators. However, known ablative materials have experienced localized heat deposition on the surface that builds up faster than the heat can be directed away from the surface. As a result, the surface temperature rises rapidly and can lead to thermal degradation of the surface. Organic components then vaporize, leaving behind a charred surface. This can lead to the melting or vaporizing of underlying structural layers and fibers that become exposed. Further, pockets of hot gas may lead to micro-explosions, fracturing and rapid failure.

BRIEF SUMMARY

The present disclosure is directed to a method for protecting a structure against damage from incident directed energy. The structure surface preferably comprises a coating and at least one enclosure. The coating preferably comprises a sensing layer, and the enclosure further comprises a contained amount of an incident energy-dissipating material in the enclosure. The enclosure is in communication with the sensing layer. The method comprises the steps of, locating the sensing layer at predetermined locations on the structure surface, locating the enclosure at predetermined locations on the structure surface; sensing incident directed energy at the sensing layer, and activating the incident energy-dissipating material at predetermined locations on the structure surface.

Preferably, the enclosure is selected from the group consisting of an applique and a container, and the coating is preferably applied to the structure surface as an applique and comprises the sensing layer and the incident energy-dissipating material. In another variation, the enclosure is a layer in the coating. The coating further comprises at least one layer including a top coat layer, a reflective layer, a base layer, an adhesive layer, and combinations thereof.

The incident energy-dissipating material comprises components dimensioned to at least partially dissipate incident directed energy wavelengths and preferably comprises materials including nano-materials, non-nano-materials (micro-particles, macro-particles, etc.), ablative materials, and combinations thereof, etc.

According to a preferred aspect, at least a portion of the enclosure at least partially releases from the structure surface, before releasing incident energy-dissipating material. The incident directed energy is sensed by the sensing layer, and enclosures at predetermined locations activate predetermined amounts of incident energy-dissipating material. It is understood, for purposes of this disclosure, that the term "activate" includes the process of preparing for the release of energy-dissipating material, including sensing to release such material. Further, according to one aspect, the enclosures are located remotely from a point of incident directed energy on the structure surface. Preferred structure surfaces include aircraft, vehicles, and stationary structures.

The present disclosure is further related to a system for protecting a structure against damage from incident directed energy having at least one wavelength, the system comprising a coating comprising a sensing layer that comprises at least one sensor. The coating is located at predetermined locations on the structure surface. A contained amount of incident energy-dissipating material is contained in enclosures in communication with the sensing layers, and the enclosures are located at a predetermined location on the structure surface. Incident directed energy is sensed at the sensing layer and incident directed energy-dissipating material is activated within the enclosures at predetermined locations on the structure surface. The enclosure can be an applique, a container, and combinations thereof, and the coating can be applied to the structure surface as an applique, and can comprise the sensing layer and the incident energy-dissipating material. The coating can further comprise at least one layer including a top coat layer, a reflective layer, a base layer, an adhesive layer and combinations thereof.

The incident energy-dissipating material comprises material including components dimensioned to at least partially dissipate incident directed energy wavelengths such as nano-materials, non-nano-materials, (micro-particles, macro-particles, etc.), ablative materials, and combinations thereof, etc. According to one variation, at least a portion of the enclosure at least partially releases from the structure surface before releasing the incident energy-dissipating material, and incident directed energy is sensed at a sensing layer, and enclosures at predetermined locations on a structure surface activate predetermined amounts of incident energy-dissipating material. The enclosures may be located remotely from a point of incident direct energy on the structure surface. The structure to be protected from incident energy, and thus employing the systems of the present disclosure to advantage, include aircraft, vehicles and stationary structures.

The present disclosure further contemplates coatings for protecting a structure against damage from incident directed energy comprising a base layer having an adhesive layer, at least one reactive layer comprising incident energy-dissipating material, and a reflective layer disposed between the base layer and the reactive layer. The preferred coating is in communication with at least one sensor for sensing incident directed energy, and may comprise a sensing layer, and may be in the form of an applique. According to an aspect, the coating further has a top coat that may comprise a metallic compound including aluminum, silver, gold, titanium nitride, titanium carbide, etc. and combinations thereof. The coatings preferably have an average thickness ranging from about 0.01 μm to about 5,000 μm.

According to further aspects, the reactive layer comprises a nano-thermite-containing compound, selected from the group including an oxidizer, such as, for example a perchlorate, an azide, a peroxide, etc., any metal nano-particles such as, for example, iron-containing, titanium-containing, aluminum-containing particles etc., and combinations thereof. The reflective layer preferably also comprises a metal such as, for example gold, indium, silver, aluminum, titanium-nitride, titanium carbide, and combinations thereof. The reflective layer could be a non-metal, such as, for example, a multi-layer interference or dielectric stack of polymers. The reflective layer could also comprise e.g., selenium, tellurides, etc., and combinations thereof, etc.

In the case of an aircraft, the top coat layer preferably comprises air vehicle paints or other various polymer compounds including any epoxy resin or resins, and acrylic mix, etc. Such useful top coat materials may further comprise dopants or absorptive material. Preferred dopants and/or absorptive materials include, carbon, etc.

When present, the ablative layer preferably comprises nano-particle, micro-particle and macro-particle compounds such as, for example, corner cube reflectors made of crystalline substances, flat reflectors such as graphene sheets, nano-dust such as those comprising molybdenum disulfides, etc.

According to the disclosure, the incident energy-dissipating material is released from the coating, at times substantially simultaneously, once the sensing layer senses incident directed energy, with reaction times ranging from about 10 nsec to about 10 sec, and more preferably ranging from about 1 msec. to about 100 msec. (from the time the coating senses incident directed energy at a structure surface until energy-dissipating material, in some cases, nano-ablative material, is released from the layer or layers in the coating).

BRIEF DESCRIPTION OF THE DRAWINGS

Having thus described variations of the disclosure in general terms, reference will now be made to the accompanying drawings, which are not necessarily drawn to scale, and wherein:

DETAILED DESCRIPTION

The present disclosure contemplates apparatuses, methods and systems for the protection of a substrate against incident directed energy (such as, for example, lasers, etc.) in a responsive fashion. Contemplated substrates include, for example, ground, air, and marine vehicles as well as stationary objects including target substrates such as radar and communications installations, etc. According to the present disclosure, lightweight appliques are constructed and applied to a substrate surface to protect the surface from incident high energy sources, such as, for example, laser beams. The preferred appliques can be suitably tailored to meet specific requirements, and are preferably thought to complement coating systems. The preferred appliques are preferably designed to protect against incident energy and corrosion, while also preferably maintaining a desired outward appearance, as well as facilitating repair and replacement after an incident energy strike. Still further, according to one variation, the appliques comprise a sensing feature or sensing layer in communication with an incident energy-dissipating material layer.

A desirable incident energy-dissipating material layer should substantially uniformly and predictably degrade. Energy incident upon the incident energy-dissipating layer is absorbed by a complex combination of de-polymerization, melting, vaporization, chemical decomposition, etc. Gases formed in under-layers should ideally be vented predictably to the surface. However, expelled dust and gases that are ejected from the incident energy-dissipating layer may impact the immediate surface, and may or may not absorb further incident energy. This creates a "stand-off" layer that impacts the ability of the incident energy-dissipating layer to direct heat away from a substrate surface.

According to one aspect, methods, systems and apparatuses are disclosed for the construction and application of a lightweight applique for aircraft structural protection that is able to sense and react to incident directed energy, such as from a directed energy attack, by deploying particles from an incident energy-dissipating material layer to form a particulate "screen", "cloud" or "shield". Preferably, the applique system performs as a subsystem capable of sensing, and then reacting, substantially instantaneously, to high power energy threats (e.g. threats having a power density ranging from about 10 W/cm$^2$ to about 10,000 W/cm$^2$).

According to preferred aspects, the present disclosure contemplates lightweight high power sensing layers suitable for incorporation into an applique or other enclosure type incorporating an incident energy-dissipating material for use on aircraft, spacecraft, vehicles, satellites, as well as stationary objects and structures. The energy absorption away from the surface is enhanced as compared to known solutions, by increasing the speed, for example, that an opaque dust of particulate material is formed at a pre-determined distances above and away from a surface; preferably a surface in motion. The release of the incident energy-dissipating material away from the surface is preferably predictably tailored to convert energy from a wavelength of an incident high energy beam (e.g. a laser beam) to re-radiation, and coordinated to achieve a predetermined and predictable material release from other areas, such as, for example, areas adjacent to a target region receiving incident directed energy. According to one variation, the incident energy-dissipating material is an ablative material comprising ablative nano-particles.

According to a further aspect, the applique comprising the incident energy-dissipating material layer also comprises sensing technology to actively sense incident energy, in substantially real time, such as, for example, from a directed energy attack. The sensing layer or layers are placed in communication with the layer or layers containing the incident energy-dissipating material and substantially simultaneously and predictably activate amounts of incident energy-dissipating material from the applique affixed to a substrate surface. In this way, the incident energy-dissipating material is released from the applique to a predetermined distance, and therefore away from a substrate surface in the form of a predictably deployed screen or cloud of incident energy-dissipating ablative material. As a result, the applique comprising the incident energy-dissipating material performs as a sub-system capable of sensing high power threats such as, for example, from an incident energy beam, and controlling a reaction to such threats. (e.g. threats having a power density ranging from about 10 $W/cm^2$ to about 10,000 $W/cm^2$).

In addition, the use of appliques for housing an incident energy-dissipating sub-system facilitates repair of the vehicle or structure surface following a directed energy attack, as damage preferably occurs at the applique and not on the underlying surface. As a result, an incident energy impacted vehicle or structure can be repaired more quickly and easily following a directed energy attack, for example, by removing and replacing the effected applique(s). The ability to protect an underlying structure surface during attack, and also effect repair through applique replacement, makes the apparatuses, methods and systems disclosed herein highly advantageous, as compared to solutions relating to direct paint-type coatings or other surface treatments. In addition, according to further variations, the ablative appliques may comprise additional functionalities such as, for example, lightning protection, use as conformal antennae, as well as improving compliance with limits on the release of volatile organic compounds (VOCs) into an environment (which may otherwise occur with various paint coatings or composite material degradation, etc.).

One preferred aspect contemplates the use of appliques containing incident energy-dissipating materials able to provide protection from a laser light source emitting at a wavelength ranging from about 0.5 to about 1.6 microns (assuming a power density approximately equal to CW 100 kW beam disposed over a 100 $cm^2$ area). It is understood that absorption of this range of power density could cause significant damage to an unprotected surface. According to the present disclosure, once the energy is detected by sensors, preferably in a sensing layer, located within or outside of the applique, the incident energy-dissipating material is activated and/or released from the affected area such that the incident energy reacts with material that is no longer part of the vehicle or structure surface. The intervening, released material provides multiple pathways for the incident energy to be redirected away from the vehicle or structure surface. Stated another way, the use of appliques comprising incident energy-dissipating materials provides a rapid transition (substantially instantaneously), such that the directed energy attack is directed from a structure's surface to a region of ablated material that is predictably directed away from a structure's surface.

According to contemplated aspects, the applique comprises a layered film. The base film layer of the applique is preferably designed to adhere to a substrate's surface to be protected, and preferably comprises an adhesive such as, for example, a pressure-sensitive adhesive (PSA) backing material.

The outermost layer of one preferred applique is preferably a top coat selected and designed not only for visual appearance, but is selected and designed to protect the layers of the appliques, while being able to predictably and effectively allow for the substantially simultaneous activation of incident energy-dissipating material from incident energy-dissipating material layer(s) of the applique when the incident energy-dissipating material layer(s) are activated for release. Therefore, according to preferred aspects, the applique layers provided between the top coat and the base film preferably comprise incident energy-dissipating materials able to counter-direct a directed energy attack. In addition, according to preferred aspects, a highly reflective layer preferably is oriented proximate to the base film layer and the layer(s) of incident energy-dissipating material. Further, reactive layers are preferably located proximate to the incident energy-dissipating layers, or are incorporated integrally within the incident energy-dissipating layers, and can activate and/or release the incident energy-dissipating material.

One type of incident directed energy is an emitted beam from a laser. The laser protective function of the appliques according to the present disclosure is accomplished by including in the applique at least one incident energy-dissipating component layer that, upon receiving intense laser irradiation having a power density ranging from about 10 $W/cm^2$ to about 10,000 $W/cm^2$, substantially simultaneously releases a particulate "cloud" or "screen" capable of deflecting the majority of the incident laser power away from the initially irradiated surface region. When material from an ablative layer is released from the applique, the applique preferably also reveals a highly reflective layer left on the base film. The highly reflective layer further limits the absorption of any lingering incident directed energy still left in the area and that may otherwise be directed to the substrate surface. The reflective layer may comprise components including, for example, gold, indium, silver, aluminum, titanium-nitride, titanium-carbide, etc., and combinations thereof, with metallic components, e.g. aluminum, silver, etc. being particularly preferred. The reflective layer could also comprise selenium, tellurides, etc. and combinations thereof.

According to one aspect, the applique integrally comprises an activating mechanism for releasing ablated particulates from ablative layer(s), upstream, downstream from, or elsewhere away from the region of incident directed energy impingement to further enhance the "screening effect" of the ablative material. That is, according to preferred aspects, once a threat is received and sensed, ablative material is released not only from appliques at the area directly impacted, but also is predictably released from appliques affixed to surrounding regions of the structure, for example, upstream or downstream, etc., depending on the intensity of the incident energy being sensed. The substantially simultaneous incident energy sensing and releasing of ablative material (in an amount determined by the intensity of the incident energy) away from an impinged aircraft, is thought to afford a pilot the critical time necessary to effect evasive maneuvers to evade the directed energy attack, by preventing sustained illumination of a particular surface.

Figure 1:
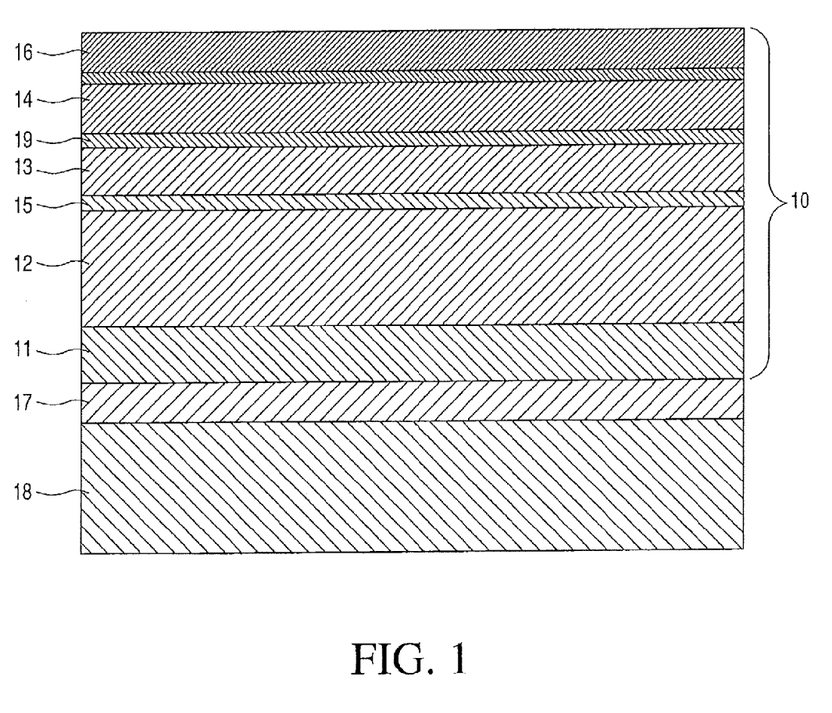
FIG. 1 is a schematic diagram showing the layers of an applique in one preferred variation, with the applique attached to an aircraft skin or structure.

FIG. 1 shows one preferred aspect with an applique 10 comprising several layers. The applique 10 is shown adhered to a primer/anticorrosive coating 17 on an aircraft skin/ structure 18. The applique 10 comprises a base film 12 having first and second sides. One side of the base film 12 comprises an adhesive layer 11 disposed to contact the primer/anti-corrosive coating 17. The other side of the base film 12 is oriented adjacent to particulate-filled incident energy-dissipating material layers 13 and 14. A highly reflective layer 15 is oriented between the base film 12 and the incident energy-dissipating material layer 13. FIG. 1 further shows a reactive, or fuse layer 19 oriented between the incident energy-dissipating layer 13 and incident energy-dissipating layer 14. It is understood that, in an applique having more incident energy-dissipating material layers, more reactive fuse layers may be present between incident energy-dissipating material layers or located elsewhere in the applique. Incident energy-dissipating material layers 13 and 14 are shown covered by a top coat 16.

Figure 2:
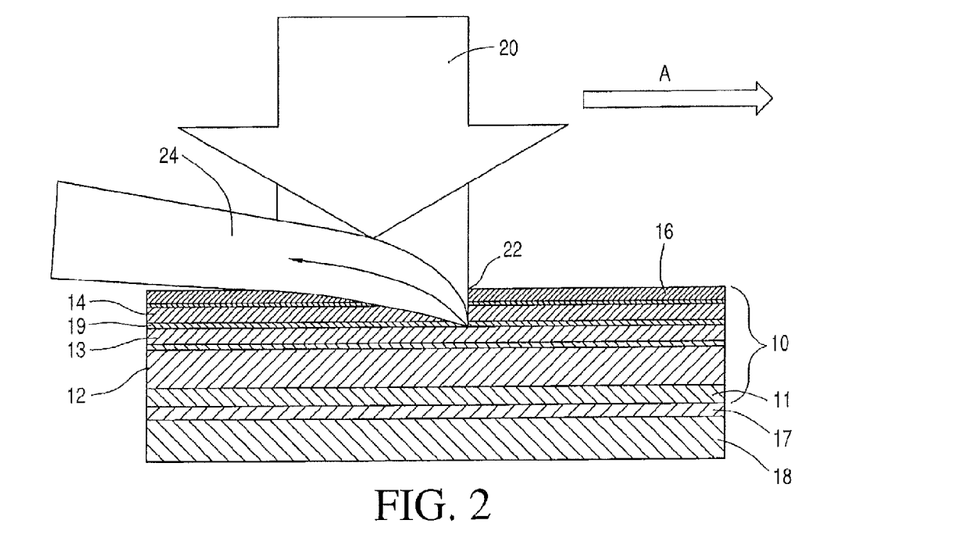
FIGS. 2 and 3 are diagrams showing the pre-determined release of ablative materials from an ablative layer in response to incident energy.
Figure 3:
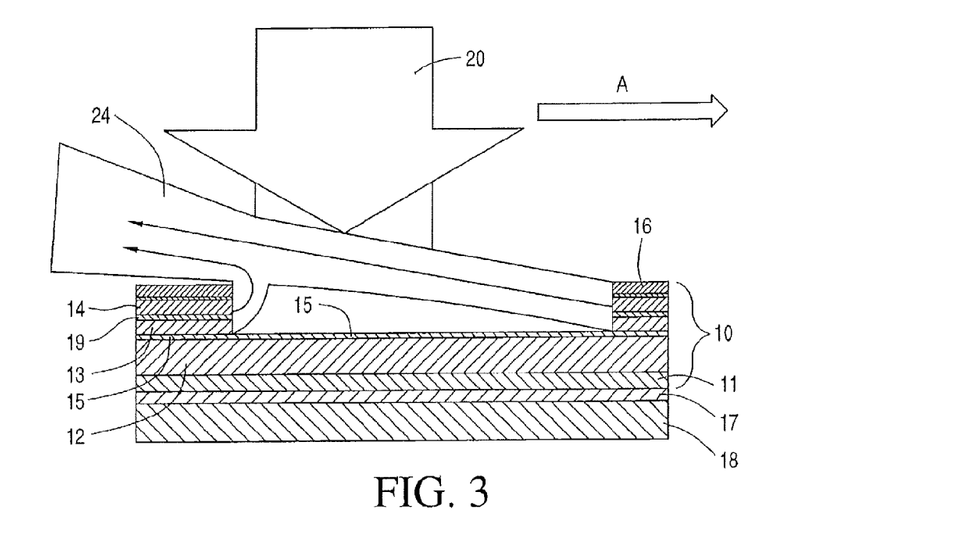

According to one preferred aspect, as shown in FIGS. 2 and 3, when the appliques shown in FIG. 1 receive and sense incident directed energy (e.g. laser beam), a release of a predetermined amount of particulate from the incident energy-dissipating material layers of the appliques occurs. More specifically, as shown in FIG. 2 an incident high power laser beam 20 impacts the surface of the protective applique 10 positioned on an aircraft skin/structure 18 (and its primer layer 17) at a region of incident attack 22. Arrow "A" denotes the direction of flight for the aircraft under incident radiation or other high energy attack. As the incident radiation is sensed, incident energy-dissipating material 24 is released from incident energy-dissipating material layers 13 and 14 and through top coat layer 16.

FIG. 3 shows a further aspect where the receiving and sensing of a high power laser beam 20 activates the release of incident energy-dissipating material 24 from incident energy-dissipating material layers 13 and 14 through top coat layer 16 not only at the region of incident attack 22, but also upstream of the region of incident attack 22. Arrow "A" denotes the direction of flight for the aircraft under radiation attack. As the incident energy-dissipating material 24 is emitted from the incident energy-dissipating material layers 13 and 14 of the applique 10, reflective layer 15 may be substantially simultaneously partially exposed to the incident high power laser beam 20 able to pass through the particulate screen formed by the emitted incident energy-dissipating material 24. The upstream release of screening particulates of incident energy-dissipating material is preferably accomplished by a chemical or thermal reaction initiated on a region preferably located upstream from the upstream edge of the point at which the laser impacts the applique surface. The reaction and release of the incident energy-dissipating material is activated in a manner similar to an explosive fuse, with the reaction front progressing upstream and/or downstream of the point of impact. The released stream of particulates thereby forms a particulate "screen" of incident energy-dissipating material, such as, for example, ablative material that effectively covers and protects the region of laser impingement.

Therefore, according to aspects of the present disclosure, the "sensing" and "activating" functions are both functionally accomplished by and within the appliques. These "passive" sensing and activating functions may occur in a single layer, or multiple and separate layers. According to one aspect, a barrier layer is present and can be used to substantially surround a reactive particle layer to prevent material degradation and/or premature reaction.

Figure 4:
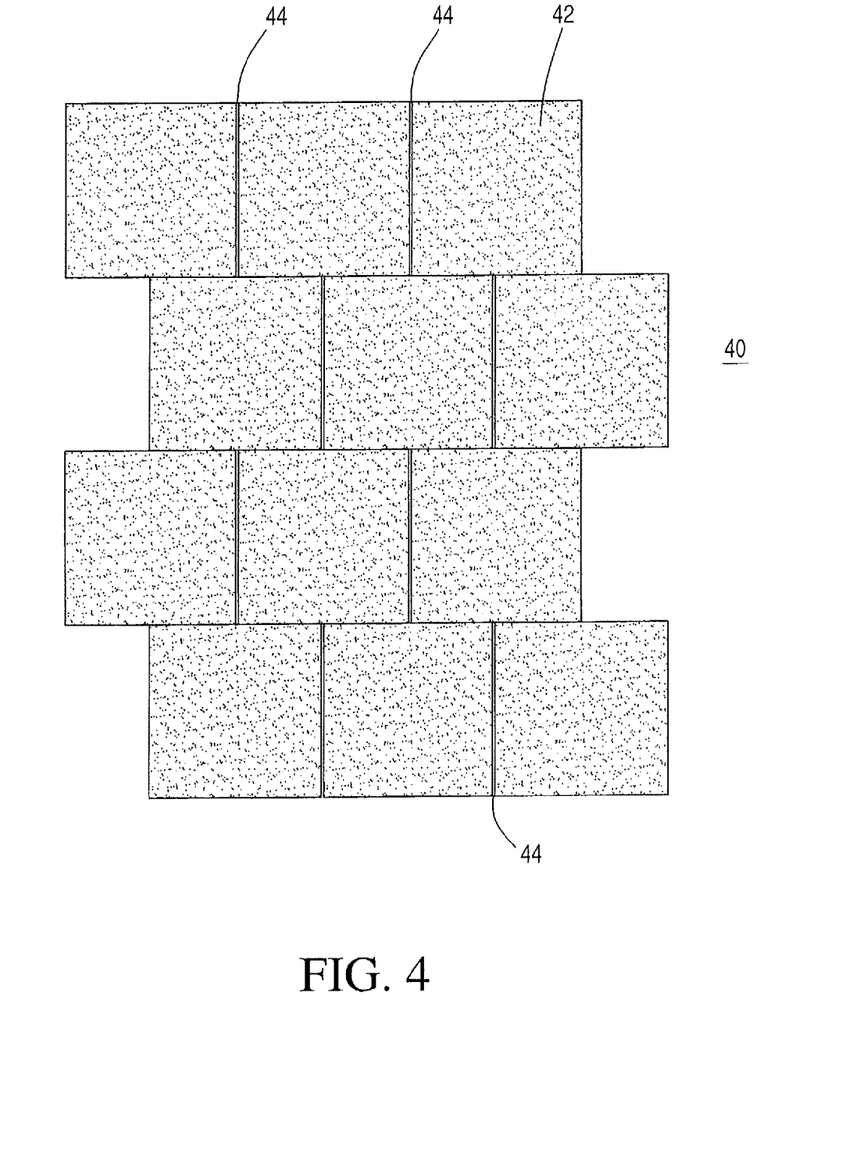
FIG. 4 is a schematic drawing of one variation showing appliques applied in a staggered orientation.

FIG. 4 shows an orientation 40 of the appliques 42 according to one aspect of the present disclosure. The appliques 42 are positioned onto a surface. Reaction zone "breaks" 44 occur at predetermined intervals throughout the appliques, such as, for example, every 5 cm, and also occur between the appliques 42. Such reaction zone "breaks" 44 are designed to impede a reaction from extending beyond a desired zone in response to incident energy striking the surface of the appliques.

Figure 5:
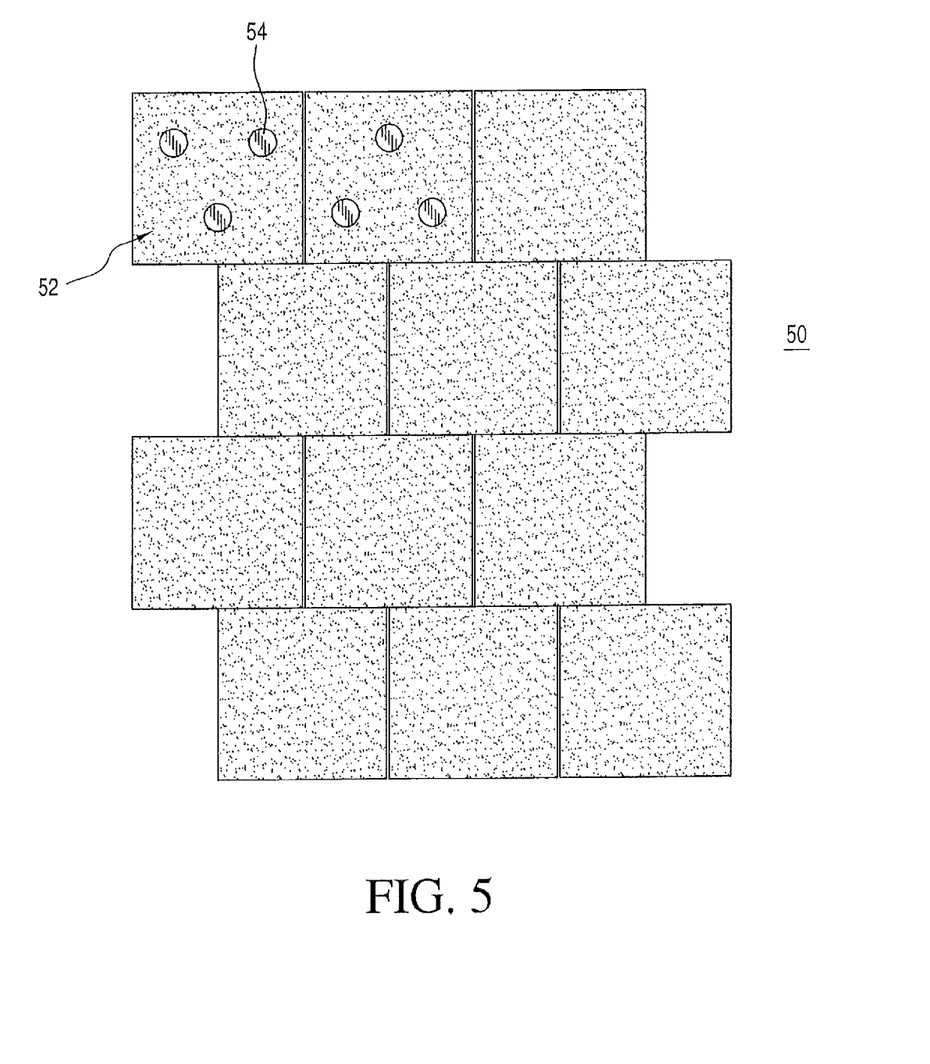
FIG. 5 is a schematic drawing of the appliques of FIG. 4 showing sensors.

FIG. 5 shows the orientation 50 of the appliques 52 comprising sensors 54 distributed in a predetermined configuration across and throughout the appliques surface. The sensors 54 may be distributed in a continuous or discontinuous layer throughout the appliques.

The incorporation of "firebreaks" into the reactive ablative layers to effectively segment the activation of incident energy-dissipating material ensures against the inadvertent activation and/or release of material outside of the critical region of the aircraft or structure under energy attack. The specific design for the size and spacing of the "firebreaks" is dependent on the particular aircraft or vehicle or stationary structure employing the systems of the present disclosure, and should take into account vehicle design, velocity, expected ambient conditions, as well as the specifics of the reactive (and in the case of ablative materials, preferably nano-thermite) layer(s). Effective "firebreaks" may comprise a predetermined gap in the reactive layer, a built-in fuse layer, or other design as necessary to prevent inadvertent release of incident energy-dissipating material, etc. Without being bound to any particular theory, it is thought that the design of the "firebreaks" will likely be narrower along the forward edge of the applique compared to sides of the appliques due to the effective cooling provided by the vehicle velocity and airflow. One preferred configuration is a set of narrow stripes or strips that are preferably aligned with the airstream direction. Stripes of finite length in concert with non-aligned, varying start-and-stop points may be used to prevent the activation and ignition of the incident energy-dissipating material from spreading, for example, in a direction transverse to the airstream direction, and thus limit the spread upstream and downstream of the point of incent directed energy and initiate material activation.

Figure 6:
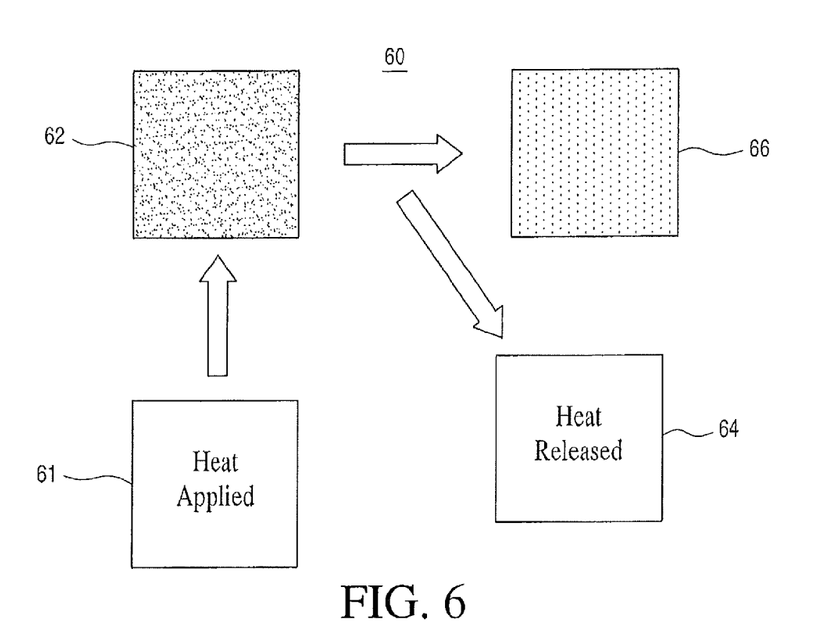
FIG. 6 is a drawing of a reaction that occurs in a single reactive layer in the appliques upon receiving incident energy.

FIG. 6 shows a drawing of a reaction sequence 60 that occurs in a layer of the applique containing the sensing layer and reactive layer in a single layer. In addition, it is understood that the sensing layer and the reactive layer may be one and the same. When impacted by incident high energy, heat 61 is applied to the applique 62. As shown, a reactive layer material in the applique 62 releases heat 64 and the reactive layer material may be transformed into a different physical or chemical structure 66. For example, a reactive material such as, a nano-thermite layer that causes disintegration of an ablative material, thereby releasing the particulate from the incident energy-dissipating material.

Figure 7:
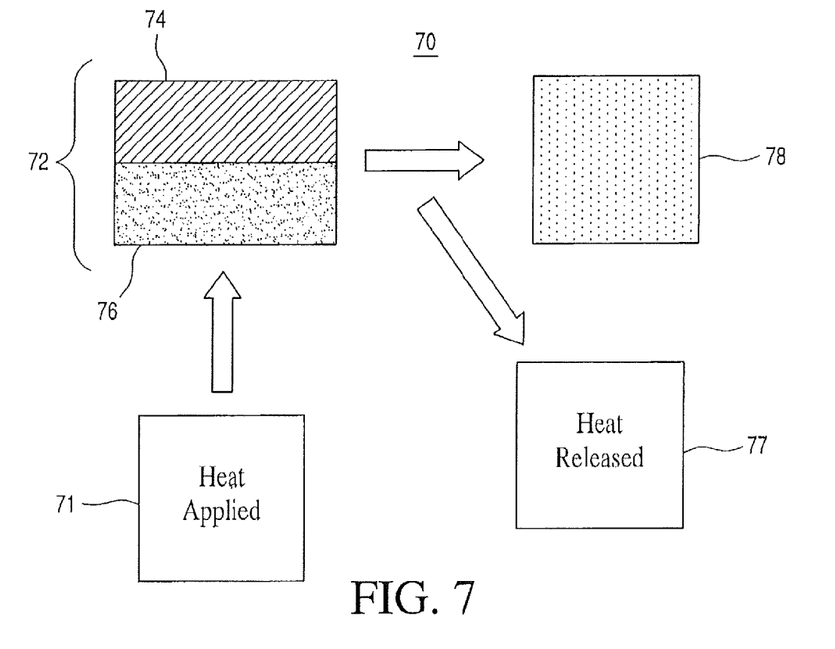
FIGS. 7 and 8 are drawings of cross-sectional views of a reaction in multiple reactive layers in an applique upon receiving incident energy.

FIG. 7 is a schematic cross-sectional view of a multilayer applique system 70. Applique 72 comprises sensing components 74 and reactive layer 76. As heat 71 is applied in the form of incident directed energy, the reactive layer 76 may include at least a portion of sensing components 74, and reactive layer 76 transforms into a different structure 78 of the compound, as heat 77 is released.

Figure 8:
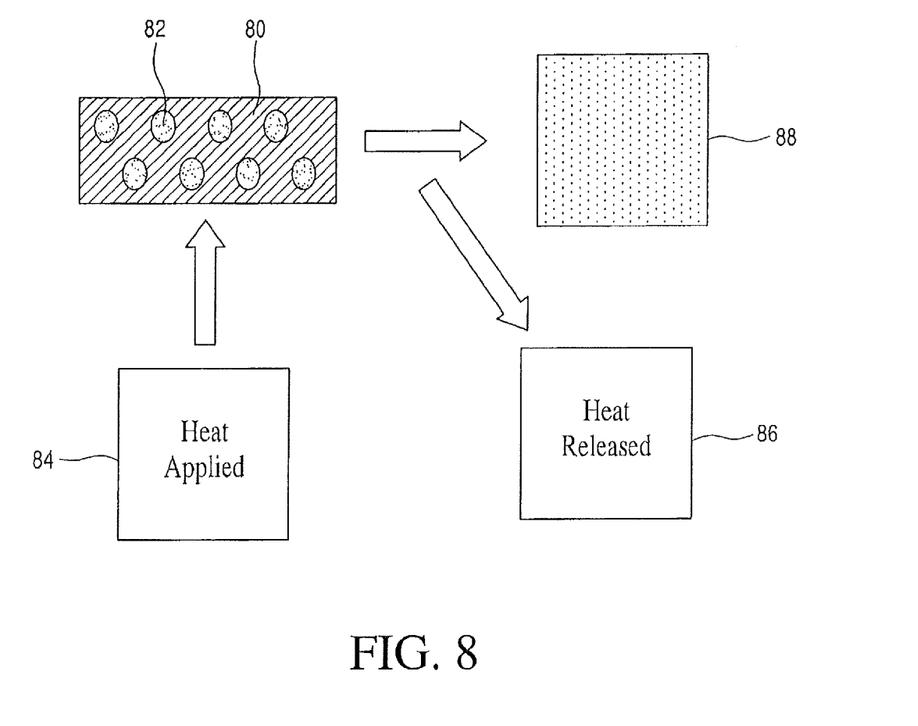

FIG. 8 shows a cross-sectional schematic view of another variation whereby a sensing layer 80 has incorporated therein an amount of reactive material 82. Once again, as heat 84 is applied and released 86 in the form of incident directed energy, the reactive material 82 may include at least a portion of sensing layer 80, and reactive material transforms into a different form or structure 88 of the material 82 shown in sensing layer 80.

The present disclosure contemplates energy-dissipating materials being contained in canisters that may be pressurized for rapid deployment. Such canisters contained in coatings or outside of coatings may be distributed about a structure to be protected. The canisters may be individually fused to an open position by incident directed energy burning through a protective surface coating and the canister's lid. In a further aspect, energy-dissipating material can be centralized into larger containers or canisters. According to this aspect, the underlying layer itself may be the canister. Fused valves are placed in contact with the underlying layer. The fused valves would then open and deploy energy-dissipating material from the container in a controlled fashion as needed, since material would only be deployed through affected fused valves.

Figure 9A:
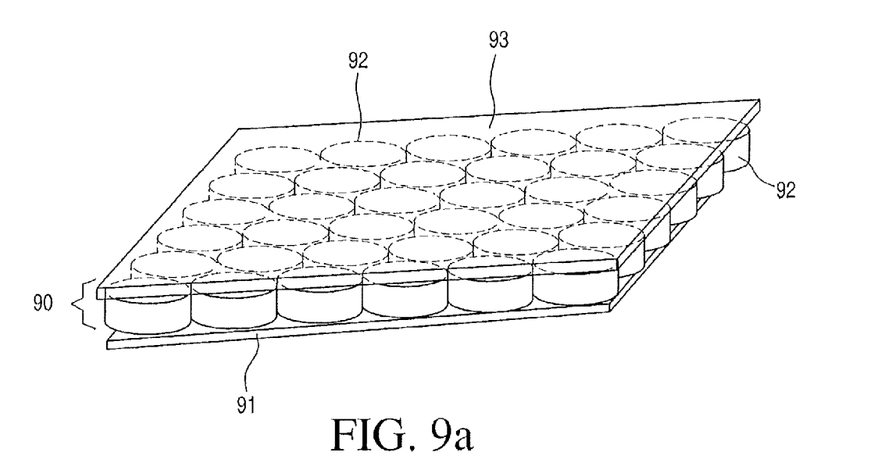
FIGS. 9a and 9b are schematic representations of discrete containers or canisters comprising energy-dissipating material.

FIGS. 9a and 9b show aspects of the disclosure, whereby the reactive enclosures are in the form of recessed containers or canisters that are activated to release incident energy-dissipating material. As shown in FIG. 9a, a coating 90 is positioned on an underlying layer 91. The coating 90 comprises a series of canisters 92 with and a protective layer 93. The canisters 92 contain amounts of incident energy-dissipating material.

Figure 9B:
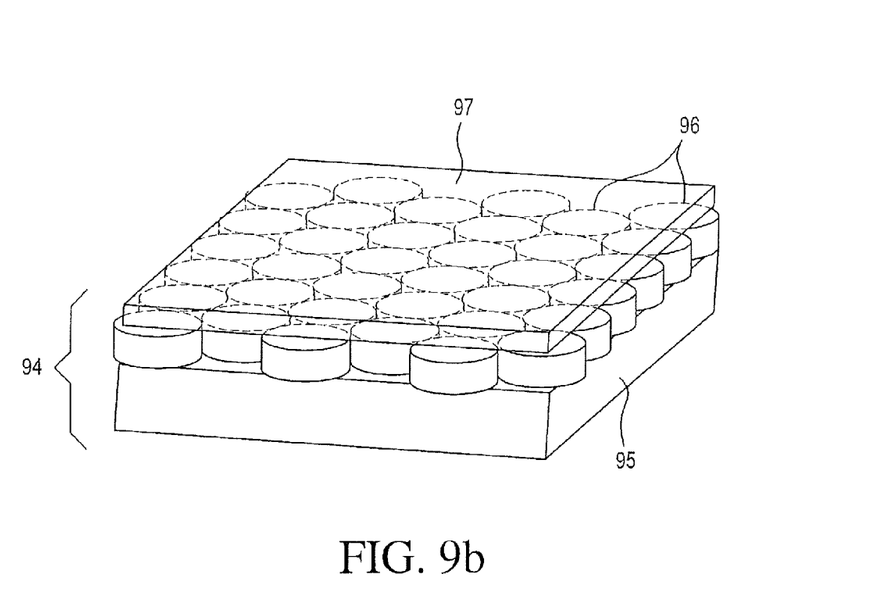

FIG. 9b shows a variation of the structure shown in FIG. 9a. In FIG. 9b, a coating 94 comprises a larger enclosure 95 (shown as a rectangle, but it may be any shape as desirable) that contains the incident energy-dissipating material. The circular canisters 96 in this variation act as valves through which the incident energy-dissipating material is released. The coating 94 also comprises a protective layer 97 that is in communication with the circular canisters 96. In another aspect, the canisters themselves are ejected from the structure surface upon sensing incident directed energy, at which point the incident energy-directed material is released therefrom.

It is further understood, that the present disclosure contemplates defensive mechanisms whereby enclosures containing incident energy-dissipating material may not only activate or release the energy-dissipating material when triggered, but the enclosures themselves may be released, in whole or in part, from the underlying structure surface in a predetermined fashion. According to this aspect, the enclosure, in whole or in part, may disengage from the structure surface to a predetermined distance away from the structure surface prior to itself activating or releasing amounts of incident energy-releasing material.

Figure 10:
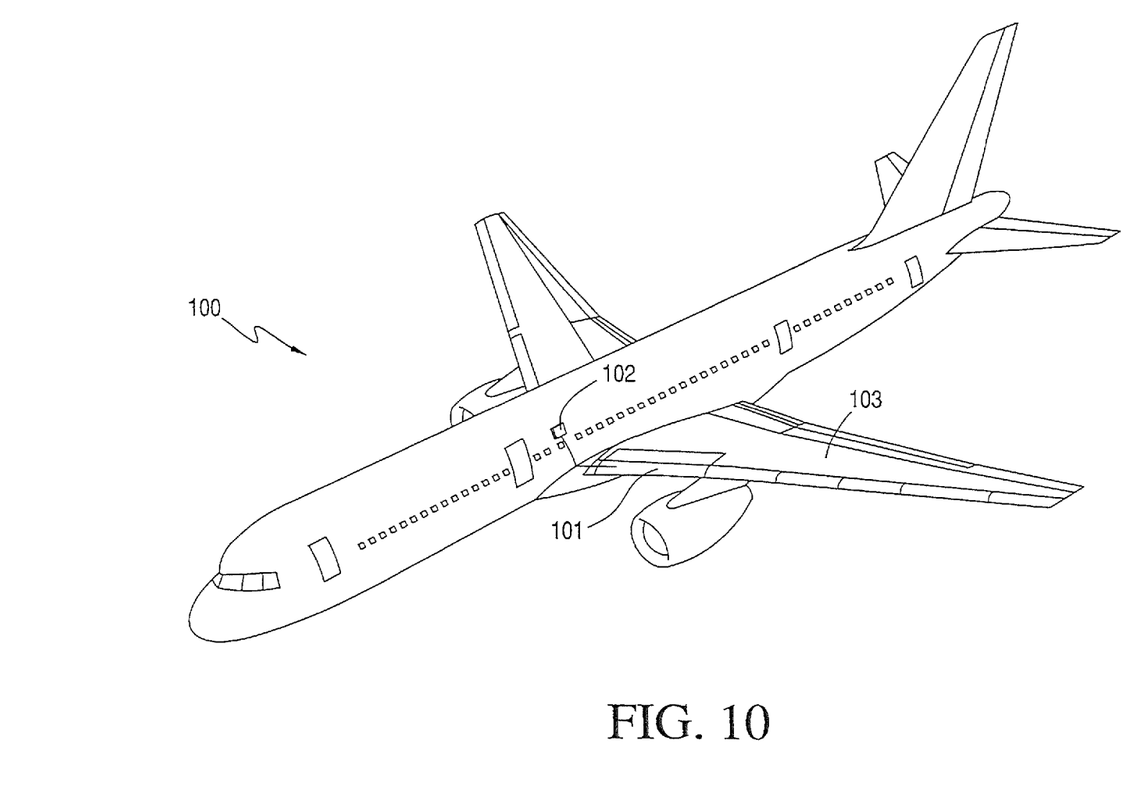
FIG. 10 is a drawing showing an aircraft comprising the apparatuses and systems of the present disclosure applied to various aircraft surfaces.

FIG. 10 shows an aircraft comprising the apparatuses, methods and systems disclosed herein. Aircraft 100 comprises fuselage, and wing sections. A section of coating according to the disclosure is shown as fuselage coating 102, and wing coating 103. It is understood that entire sections of the aircraft may be coated, such as an entire wing 101.

In a preferred aspect, the reactive incident energy-dissipating material layers and, optionally, other layers are resistant to inadvertent and unintentional, activation, ignition and release. When ablative materials are present, the ablative layers are designed to only be activated for release from the applique film when impacted by the intense energy from an incident directed attack, such as, for example, from a laser beam. In a further aspect, for a flying aircraft, substantial airflow may be required to initiate and/or sustain the chemical or thermal reaction in the ablative layers.

The thicknesses of the layers to be used in the applique, as well as the overall thickness of the applique itself is limited only by the practical considerations imposed by, for example, super- and sub-sonic flight speeds on adherence of appliques having a certain thickness and weight. The layer thickness constraints will therefore impose requirements as to the materials useful in the incident energy-dissipating layers to create a useful particulate "screen". For example, assuming an aircraft speed of 500 km/hour and an incident laser spot diameter of 10 cm, the area of the particulate screen released into the air during a 3 second protection period would be 41.7 m$^2$. Assuming a 250 µm (approximately 10 mil) ablative layer thickness, a particulate fill factor of 50% and a combined contributing area (laser spot area plus upstream area) of 0.1 m$^2$, the implied average effective particulate screen thickness is 300 nm. This example assumes substantially uniform coverage and 100% opacity. A greater number of nano-particulates in the release is desirable given the possibility of an uneven distribution. A particulate size ranging from about 10 nm to about 3000 nm is preferred with a 10× increase in the number of particles.

A further preferred geometry takes the form of a flake having a thickness ranging from about 10 nm to about 500 nm, with a length ranging from about 400 nm to about 100 µm or more, more preferably ranging from about 3 µm to about 20 µm. A prime consideration is that the lateral dimension should substantially exceed the wavelength of the incident light on the applique surface. In other words, in one aspect of the disclosure, the particles may be on the nano-scale in one dimension and on the non-nano scale in another dimension, such as the dimension transverse to the nano-scale dimension. Toward that desired end, the preferred aspect ratio for the preferred particles ranges from about 20 to about 100.

Therefore, it is understood that nano-particles, by definition, have at least one dimension smaller 1 µm. According to the present disclosure, nano-particles may be used as incident energy-dissipating particles based on their behavior as particles released to a particle cloud. However, the present disclosure also contemplates the use of larger particles (non-nano-particles including: micro-particles having a size ranging from about 1 µm to about 1 mm, and macro-particles having a size larger than about 1 mm).

In addition, according to aspects of the present disclosure, nano-particles may be used as incident energy-dissipating particles based on their behavior as particles released to a particle cloud. Aspects of the present disclosure also contemplate the use of larger particles (non-nano-particles) whose dimensions more closely match that of incident directed energy wavelengths. Therefore, small structures of any geometric shape that have a size across any aspect of its geometry that is approximately equivalent to (and preferably exceeding) incident directed energy wavelengths are contemplated by the present disclosure. According to one preferred aspect of the disclosure, small structures are contemplated having a thickness in the nano-scale region and an aspect ratio ranging from about 20 to about 100.

In addition, a "glitter-bomb" comprising small segments of flat metallic reflective particles could also be used according to the present disclosure. Such particles would lie flat within the appliques, but once released would tend to "peel" out into the airstream. In addition to the diffractive characteristics of the particles used, reflective particles may be fabricated from layered polymers of differing refractive indices to create wavelength specific reflectors. Reflective particles fabricated using photolithographic methods that can be sized at approximately 10 µm or larger, and are essentially small corner cubes that can direct energy away from the target and back toward the threat origin.

Therefore, while aspects of the present disclosure further contemplate the use of nano-particles in an ablative or non-ablative incident energy-dissipating material, it is understood that other ablative materials will be useful in the apparatuses, systems and methods of the present disclosure, including micro corner cubes, glitter fabricated from metal coatings, holographic coatings, etc. When non-nano-ablative particles are used, it is further understood that the appliques containing such ablative layers may be thicker than the appliques containing the nano-ablative materials.

One goal of the appliques and material release systems of the present disclosure is to divert and dissipate incident laser energy away from a target such as for example, an aircraft, satellite, terrestrial, non-terrestrial or marine vehicle, or stationary structure, and/or to diffuse incident energy adequately to such an extent that the energy level falls below a damage threshold.

A further preferred aspect contemplates the incorporation of quantum dots as additional absorbers into, for example, the nano-ablative material matrix. Quantum dots possess the desirable characteristic of splitting absorbed energy between thermal and re-radiated optical energy having a narrow waveband. Conceivably, coatings optimized for refection in such wavebands would effectively reject re-emitted light. Quantum dots can be designed to absorb over a specific range, and emit over another specific range of wavelengths.

According to a still further preferred aspect, a nano-ablative matrix comprises nano-particles that will form the nano-particulate screen, and ablative layers release the nano-particles in a steady, substantially uniform manner under high power laser illumination. The nano-particle release and associated disintegration of the nano-ablative matrix preferably occurs at a temperature that will not cause excessive heating of the applique base film, adhesive, primer or aircraft surface. According to one preferred aspect, materials comprising graphite flakes or molybdenum disulfide ($MoS_2$) are incorporated in substantial amounts (ranging from about 10 to about 90 weight percent of the applique base film) into the ablative matrix. Molybdenum disulfide sublimes at about 450° C. and will facilitate disintegration of the nano-ablative matrix at or above such temperature. In another aspect, sodium hydrate or cross-linked polyethylene will be appropriate at temperatures ranging from about 70 to 100° C.

According to preferred aspects, one or more reactive layers are incorporated into the applique layered matrix, and are preferably located within the nano-ablative layer matrix. The reactive layers are responsible for regulating the release of the nano-ablative material from the ablative layers, preferably from the point on the aircraft, spacecraft or other vehicle, etc., at about the upstream edge of an incident laser beam to points upstream as desired, as well as regions downstream from an incident laser beam, if desired. The reactive layer is capable of ignition by the incident laser beam. The reactive layers must also be highly resistant to unintentional or inadvertent ignition, such as by mechanical or other means. For example, for a fast moving, sub-sonic aircraft, the reaction front should initiate upstream at a rate of about one foot per second in order to release enough nano-particulate material to provide adequate laser protection.

The reaction temperature and energy released should be sufficient to cause disintegration of the ablative matrix, but low enough to minimize heat flow to the base film and aircraft surface. One preferred reactive material contemplated for incorporation into the reactive layer(s) is nano-thermite, being suitable for laser-induced ignition, while offering substantial design freedom relative to burn rate, temperature, reaction and released energy density, etc. Nano-thermite materials are a combination of nano-particulate metal (fuel) and oxidizers. Other materials can be combined with the nano-thermite to achieve a desired burn rate. A nano-thermite or "super-thermite" is understood to be a metastable intermolecular composite (MIC) characterized by a particle size of its main constituents (for example, a metal and a metal oxide, with particle sizes of under about 100 nm). This allows for high and customizable reaction rates. Nano-thermites comprise an oxidizer and a reducing agent that are intimately mixed on the nanometer scale. Preferred thermites include: aluminum-molybdenum(VI) oxide; aluminum-copper(II) oxide; aluminum-iron(II,III) oxide; antimony-potassium permanganate; aluminum-potassium permanganate; aluminum-bismuth(III) oxide; aluminum-tungsten(VI) oxide hydrate; aluminum-fluoropolymer; titanium-boron (burns to titanium diboride); with an aluminum iron oxide being particularly preferred.

It is further understood that aspects of the present disclosure contemplate appliques for slow moving or even static potential targets. It is understood that for such slower moving targets, the reaction front may be designed to advance more slowly for the purpose of producing a longer-lasting billowing-type nano-particulate cloud for effective laser protection.

According to still further aspects, a highly reflective layer is provided in the applique preferably at the interface between the ablative layer matrix and the base of the applique film (See FIGS. 2 and 3). This layer becomes exposed as the ablative material is emitted from the applique, and further helps to limit the heat and radiation absorbed from the incident high energy attack. The reflective layer may comprise metallic compounds and metals e.g., gold, indium, silver, aluminum, titanium-nitride, titanium carbide, etc., and combinations thereof. The reflective layer could be a non-metal, such as, for example, a multi-layer interference or dielectric stack of polymers. The reflective layer could also comprise e.g., selenium, tellurides, etc., and combinations thereof.

The base film of the applique acts as a primary structural component of the applique system, and preferably provides an environmental barrier for the aircraft surface and any primer or corrosion coating that is placed onto the aircraft surface. On one side, the base film preferably comprises an adhesive layer that affixes the applique to the structure to be protected (e.g. an airframe, etc.). On the other side, the base film preferably comprises a reflective layer, followed by the incident energy-dissipating material layer(s). According to a further aspect, the base film has a very low thermal conductivity and a high maximum use temperature, for example, in excess of about 800° K. Polyimide films such as poly(vinyl fluoride), Kapton (DuPont), Vespel (DuPont) are preferred, with poly(vinylfluoride) being particularly preferred. These base films may be continuous or non-continuous films or may be woven or braided layers.

The adhesives used to secure the applique system to a structure preferably possess characteristics so as not to be degraded by exposure to various fluids, such as, for example, fuel, hydraulic fluid, etc. The preferred adhesives are pressure sensitive, and are highly resistant to the intrusion of corrosive fluids, such as, for example, salt water, etc., into the region between the applique and the primer or coating on the structure. Suitable preferred adhesive preferably comprise 3M 9086, 3M 9088, and combinations thereof, with 3M 9088 being particularly preferred.

The outer top coat layer of the applique system preferably meets the required characteristics met by the outer surface of the structure itself, including, color, spectral reflectivity and gloss, etc., since such characteristics govern the overall outer appearance of the structure being protected by the applique, (e.g. aircraft, spacecraft, vehicle, stationary structure, etc.). Standard top coat paints may be used on preferred applique systems.

Selection of the coating material is important to avoid known ablative problems, such as, for example, the unintended trapping of sub-layer gas pockets that could lead to micro-explosions fracturing the applique. According to the present disclosure, an ablative matrix coated with a metallic surface protects the integrity of the applique and further supplies added reflectivity of the surface against threshold and sub-threshold high energy attacks on the surface. In addition, a metallic coating provides some lateral conduction of heat away from an area of the surface under "attack". Therefore, according to preferred aspects, the applique system comprises an outer environmental barrier that the final top coat will be applied to. The environmental barrier preferably comprises a material comprising an anti-corrosive paint, a poly-urethane, a water-proof plastic barrier, a thin polymer film, such as, for example, aluminized mylar, etc. and combinations thereof, with a polymer film being particularly preferred.

According to another aspect, when the incident energy-dissipating material/layer is an ablative layer, such layer, comprising non-nano-particles and/or quantum dot-laden dust in an ablative matrix, alone or in combination. Without being bound to any particular theory, it is believed that the particle-laden dust particles are released to assist in creating an energy-dissipating protective boundary layer a distance above a substrate to which the applique (containing the ablative layer) is attached, preventing a majority of the incident energy from reaching the targeted substrate surface.

The known attempts at affording structures protection against directed energy attack have been generally bulky, heavy added structures to a surface. The present disclosure therefore contemplates useful ablative layers that reach a sufficiently high temperature "burn off" of a surface and, in this way, carry energy away from the structure and provides a plume of protection above the structure. Added thickness is required to ensure that heat conduction doesn't impact the underlying structure, and to ensure that enough material is available at all locations to stand off an attack on its own. According to the present disclosure, the need for excessively thick and heavy coatings is mitigated by also activating neighboring ablative protection upstream of a target area and using the airstream to pull this added protection into the region requiring protection. This gives added protection time while a pilot, with respect to an air vehicle, executes evasive maneuvers away from a directed high energy attack.

Although most examples herein have discussed the use of the applique systems on aircraft, spacecraft, and stationary structures requiring protection from incident high energy attack, the apparatuses, systems and methods set forth herein are contemplated for use with manned or unmanned vehicles or objects of any type or in any field of operation in a terrestrial and/or non-terrestrial and/or marine or submarine setting. A non-exhaustive list of contemplated vehicles includes manned and unmanned aircraft, spacecraft, satellites, terrestrial, non-terrestrial vehicles, and surface and sub-surface water-borne vehicles, etc.

While the preferred variations and alternatives of the present disclosure have been illustrated and described, it will be appreciated that various changes and substitutions can be made therein without departing from the spirit and scope of the disclosure. When introducing elements of the present invention or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this invention has been described with respect to specific embodiments, the details of these embodiments are not to be construed as limitations.

What is claimed is:

1. A method for protecting a structure surface against damage from incident directed energy, the structure surface comprising a coating and at least one enclosure, the coating comprising a sensing layer, and the enclosure further comprising a contained amount of an incident energy-dissipating material in the enclosure, the enclosure in communication with the sensing layer, the method comprising the steps of:
   locating the coating at predetermined locations on the structure surface;
   locating the enclosure at predetermined locations on the structure surface;
   sensing incident directed energy at the sensing layer;
   activating a predetermined amount of the contained amount of the incident energy-dissipating material at a predetermined locations on the structure surface; and
   releasing incident energy-dissipating material from the coating, said incident energy-dissipating material released from the coating to at least a predetermined distance from the structure surface;
   wherein the incident directed energy does not contact the incident energy-dissipating material before release of the incident energy-dissipating material from the enclosure.

2. The method of claim 1, wherein the enclosure is selected from the group consisting of an applique, container, a layer in the coating, and combinations thereof.

3. The method of claim 1, wherein the coating comprises the sensing layer and the contained amount of the incident energy-dissipating material.

4. The method of claim 1, wherein the enclosure comprises a top coat layer.

5. The method of claim 1, wherein the coating comprises at least one layer selected from the group consisting of: a top coat layer, a reflective layer, a base layer, an adhesive layer, and combinations thereof.

6. The method of claim 1, wherein the incident energy-dissipating material comprises components dimensioned to at least partially dissipate incident directed energy wavelengths.

7. The method of claim 1, wherein the incident energy-dissipating material comprises a material selected from the group consisting of: nano-particles, micro-particles, macro-particles, ablative particles, and combinations thereof.

8. The method of claim 1, wherein the enclosure is located remotely from a point of incident direct energy on the structure surface.

9. The method of claim 1, wherein the structure is selected from the group consisting of an aircraft, a vehicle, and a stationary structure.

10. A system for protecting a structure against damage from incident directed energy, said incident directed energy having at least one wavelength, said system comprising:
    a coating comprising a sensing layer, wherein said sensor layer comprises at least one sensor, said coating located at a predetermined location on the structure surface;
    at least one enclosure containing an amount of incident energy-dissipating material in the enclosure, said enclosure in communication with the sensing layer and said enclosure located at a predetermined location on the structure surface;

wherein incident directed energy is sensed at the sensing layer;

wherein incident energy-dissipating material is activated within the enclosures at predetermined locations on the structure surface; and releasing incident energy-dissipating material from the coating, said incident energy-dissipating material released from the coating to at least a predetermined distance from the structure surface;

wherein the incident directed energy does not contact the incident energy-dissipating material before release of the incident energy-dissipating material from the enclosure.

11. The system of claim 10, wherein the enclosure is selected from the group consisting of: a layer of an applique, a container, and combinations thereof.

12. The system of claim 10, wherein the coating is applied to the structure surface as an applique.

13. The system of claim 10, wherein the coating comprises the sensing layer, the enclosure, and a predetermined amount of the contained amount of the incident energy-dissipating material.

14. The system of claim 10, wherein the enclosure comprises layers selected from the group consisting of: a top coat layer, a reflective layer, a base layer, an adhesive layer, and combinations thereof.

15. The system of claim 10, wherein the incident energy-dissipating material comprises material dimensioned to at least partially dissipate incident directed energy wavelengths.

16. The system of claim 10, wherein the incident energy-dissipating material comprises materials selected from the group consisting of: nano-particles, macro-particles, micro-particles, ablative materials, and combinations thereof.

17. The system of claim 10, wherein incident directed energy is sensed at a sensing layer at a predetermined location on a structure surface, and said sensing layer in communication with an enclosure activates a predetermined amount of incident energy-dissipating material.

18. The system of claim 10, wherein at least a portion of the enclosure releases from the structure prior to activating a predetermined amount of incident energy-dissipating material.

19. The system of claim 10, wherein the enclosure is located remotely from a point of incident direct energy on the structure surface.

20. The system of claim 10, wherein the structure is selected from the group consisting of aircraft, vehicles and stationary structures.

* * * * *